No Printed Specification Available
7529X
J. Ives.
Clock.
Patented Apr. 12, 1833.
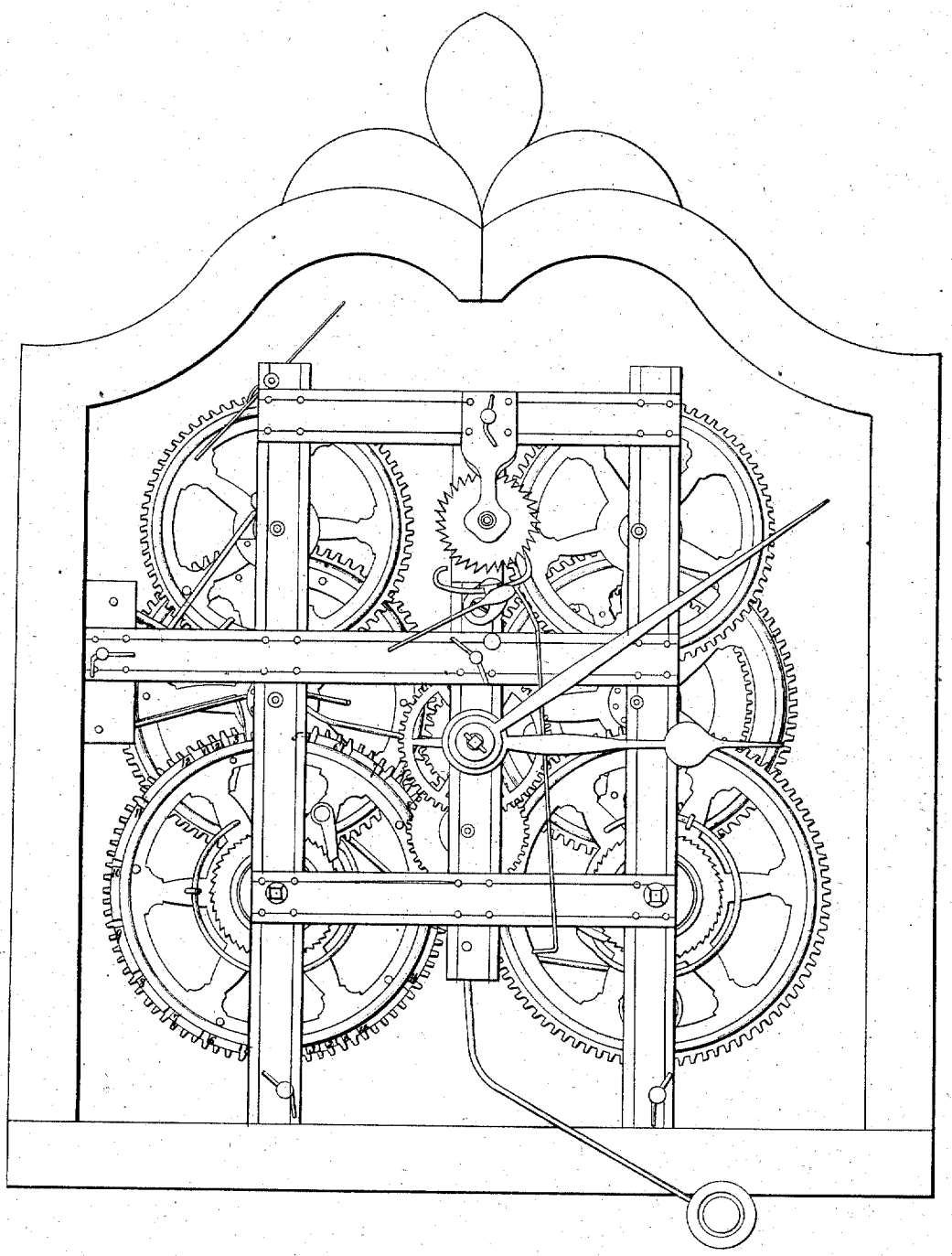
N. PETERS, PHOTO-LITHOGRAPHER, WASHINGTON, D. C.

Joseph Ives of Bristol Connecticut
Letters Patent

The Schedule referred to in these Letters Patent and making part of the same
containing a description in the words of the said Joseph Ives himself
of his improvement in the formation of the rolling pinions & pinion wheels used in clocks To all people whom these presents shall come. Joseph Ives
of Bristol in the County of Hartford and State of Connecticut -
Gentleman sends Greeting - Be it known that I the said Joseph
Ives have invented, constructed, made and applied to use a new
and useful improvement in the formation of the rolling pinions and
pinion wheels, used in the construction of the common house clocks.
Specified in the words following viz. This improvement in the
formation of the rolling pinions consists in making the pinions
wholly of one piece of metal or wood, instead of two pieces as for-
merly used. The rolling pinions as heretofore and still in use,
in the construction of Common House clocks, are made to turn
on Pivots. The pinion head or block in which the pinions turn
is made of a solid piece of wood or metal, and turned down
in the middle so as to make a space for the pinions to turn in
leaving a shoulder at each end of the block. Holes or small sockets
are made thro' each of these shoulders, and the pin or small rod
for the pivots is passed thro' these holes in the shoulders, and at
the same time thro the pinions, being tight in the pinions and loose
in the holes in which they are to turn. the ends of these pins or
rods forming the pivots of the pinions. My rolling pinions are +
made each of a single piece of metal or wood without any pin or
rod through them, and roll or turn in sockets made to fit them in
head pieces of what I term the pinion head or wheel as hereafter
described. I have two modes of making my rolling pinions, as may
be seen by the models accompanying this application. One mode
is to make the pinions of a bigness from end to end, & place

75297 each end in sockets, made to fit them in; but not thro the head pieces of the pinion head, or wheel before named, in which sockets, the pinions roll when the clock is moving. These sockets are made larger than the ends of the pinions, so as to give room for the pinions, to roll in the sockets. By the sockets not being made through the head pieces, the pinions are confined; so that they cannot get out of place endwise. The other mode is to form pivots at each end of the pinions by turning the ends down small enough for that purpose, and have these pivots turn in holes or small sockets, made to fit them, in or thro' the head pieces before named. The pinions turn on the pivots in these sockets or holes, and are confined by shoulders on the pinions formed by turning down the pinions as before stated, so that they cannot get out of place endwise. What I call the pinion head, or wheel being that part in which the pinions roll or turn, is made by forming & fixing on a shaft or arbor two round pieces of metal, or wood called head pieces - about the length of the pinions apart, one of which head pieces has a small cylinder, being a part of the head piece, and extending from its centre on the inside, on the shaft or arbor the length of the pinions with a small shoulder made on the farther end of it, on which cylinder and to the shoulder the other head piece, or end of the pinion head is fixed, and is called the cap of the pinion head or wheel. The arbor or shaft passes thro the centre of both pinion head pieces, and the cylinder which forms a part of one of them as before stated, and they are all confined to, and made tight on the arbor or shaft. The holes or sockets for the pinions to roll or turn in, are made in these head pieces, and that called the cap is placed on and fastened to the cylinder after the pinions are placed in the sockets of the other head piece -

The benefit of my improvement in the rolling pinions is that they can be made with less labor, and expense, perform with much less friction, and are not as liable to get out of repair.

7529X

In testimony that the above is a true specification of my said improvement as above described, I have hereunto set my hand and seal this 12th day of March Anno Domini 1838.

Witnesses

Henry S. Harrington

Calvin Butler

Joseph Ives.

(Patented 12 April 1838)